(12) United States Patent
Steen et al.

(10) Patent No.: US 7,226,389 B2
(45) Date of Patent: Jun. 5, 2007

(54) METHOD AND DEVICE FOR HILL START

(75) Inventors: Marcus Steen, Angered (SE); Erik Lauri, Mölndal (SE); Lars Karlsson, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 32 days.

(21) Appl. No.: 11/160,625

(22) Filed: Jun. 30, 2005

(65) Prior Publication Data

US 2006/0079377 A1 Apr. 13, 2006

Related U.S. Application Data

(63) Continuation of application No. PCT/SE03/02042, filed on Dec. 18, 2003, now abandoned.

(30) Foreign Application Priority Data

Dec. 30, 2002 (SE) .................................. 0203903

(51) Int. Cl.
*B60T 7/12* (2006.01)
*B60W 10/04* (2006.01)

(52) U.S. Cl. ...................... 477/195; 477/203; 477/900; 477/901

(58) Field of Classification Search ................ 477/195, 477/196, 200, 203, 900, 901
See application file for complete search history.

(56) References Cited

U.S. PATENT DOCUMENTS

| | | | |
|---|---|---|---|
| 4,676,354 A | 6/1987 | Janiszewski et al. | |
| 5,452,946 A | 9/1995 | Warner | |
| 5,820,515 A | 10/1998 | Fukaya et al. | |
| 5,863,277 A * | 1/1999 | Melbourne | 477/203 |
| 6,009,984 A | 1/2000 | Zechmann et al. | |
| 6,260,934 B1 * | 7/2001 | Lee | 303/192 |
| 6,411,881 B1 * | 6/2002 | Thomas | 701/167 |
| 6,439,675 B1 | 8/2002 | Zechmann et al. | |
| 7,041,031 B2 * | 5/2006 | Wheeler et al. | 477/901 |

FOREIGN PATENT DOCUMENTS

| | | |
|---|---|---|
| EP | 0507466 A1 | 3/1992 |
| EP | 0523338 A2 | 5/1992 |
| EP | 0781946 A1 | 7/1997 |
| EP | 1040957 A2 | 10/2000 |

\* cited by examiner

*Primary Examiner*—Roger Pang
(74) *Attorney, Agent, or Firm*—Novak Druce & Quigg, LLP

(57) ABSTRACT

Method and arrangement for facilitating hill-starting of a stationary motor vehicle. The method includes applying at least one braking device using a brake pedal and estimating the traveling resistance of the vehicle using a control unit (30). The control unit (30) determines a starting gear, a starting torque and a starting speed with regard to the estimated traveling resistance. The driver releases the brake pedal and the brakes are kept applied for a certain time. The driver operates an accelerator pedal to a position at least corresponding to the minimum transmitted torque and a clutch device (2) for a gearbox (3) is activated by the control unit (30) when the starting speed has been achieved. The control unit (30) releases the braking devices as a function of the increase in the transmitted driving torque of the clutch.

16 Claims, 3 Drawing Sheets

METHOD AND DEVICE FOR HILL START

CROSS REFERENCE TO RELATED APPLICATIONS

The present application is a continuation patent application of International Application No. PCT/SE2003/002042 filed 18 Dec. 2003 now abandoned, which was published in English pursuant to Article 21(2) of the Patent Cooperation Treaty, and which claims priority to Swedish Application No. 0203903-0 filed 30 Dec. 2002. Said applications are expressly incorporated herein by reference in their entireties.

TECHNICAL FIELD

The present invention relates to a method for facilitating hill-starting (start-up on a hill) of a stationary vehicle, and a device for implementing the method.

BACKGROUND OF THE INVENTION

When a vehicle is stationary on an uphill slope and is to start driving again without rolling backward, it is usual for the driver to hold the vehicle stationary using the handbrake and the footbrake. When the driver is to start driving, he or she then moves the foot from the brake pedal to the accelerator pedal. In order that the vehicle does not start rolling backward, the driver holds the vehicle stationary using the handbrake. The driver then releases the handbrake gently at the same time as applying the accelerator so that the vehicle does not roll backward. This is especially the case for manually shifted vehicles where the left foot operates the clutch.

Many different systems have been proposed for facilitating starting a vehicle which is on an uphill slope. These systems usually go by the name of "hill holder". They function by the driver, often using a switch, activating the hill start function when the vehicle is stationary. The system then holds the vehicle stationary using the service brake of the vehicle until a predetermined state occurs, for example the driver accelerates, the driver lets the clutch pedal up, the torque of the engine has a certain value, the vehicle rolls forward and the like. The system then releases the brake force.

Known hill start auxiliary systems for vehicles with manual gearboxes are described in such patents as U.S. Pat. No. 6,009,984, U.S. Pat. No. 5,452,946, U.S. Pat. No. 4,676,354, EP 523 338-A2 and EP 507 466-A1. It is a common feature of all of these systems to require one or more extra sensors which detect states in the drive line of the vehicle. Several of the systems have an inclination sensor which senses whether the vehicle is on an uphill gradient. Also included are sensors for sensing the state of the brake pedal and the accelerator pedal, the torque of the engine, the total weight of the vehicle and the like. These systems often function well for the conditions for which they are designed. As the systems are complex, it is difficult or impossible for the driver to know precisely how a certain system functions in a given situation. This may to occasions in which the system functions in a way that is not expected by the driver and could result in near accidents. Moreover, the great complexity of the systems described means that the reliability is lower than for a system that does not require a large number of external components. As an example, a fault on one of the included components can result in the system becoming unserviceable. Another disadvantage of the described systems is that the extra sensors add unnecessary cost to the selling price of the vehicle.

Another problem with the proposed systems is that it is possible to use them as a parking brake. As the vehicle is held stationary by the service brake, this means that the driver can activate the system when parking the vehicle as well, for example when stopping the vehicle for only a relatively short time such as when loading or unloading, or for launch. It is often easier to activate the system than to use the parking brake control. This also means that the driver can as a matter of routine become accustomed to using the system as a parking brake. If something should happen when the vehicle is parked in this way, the vehicle may lose braking capacity altogether. The vehicle may, for example, start to roll in an uncontrolled manner with serious damage as a consequence. This may happen if, for example, the driver is delayed and/or the brake system loses pressure more quickly than expected, for example if a component is slightly leaky.

Another known system is described in U.S. Pat. No. 5,820,515 that is intended for an automatic gearbox. As in the systems mentioned above, this system also requires one or more sensors that detect the states in the drive line of the vehicle, and an inclination sensor which senses whether the vehicle is on an uphill gradient. Also included are sensors or calculation models for estimating the state of the brake pedal and the accelerator pedal, the torque of the engine, the total weight of the vehicle and the like. A disadvantage of this system is the relatively poor efficiency of the torque converter included in the transmission.

The problems mentioned above can be solved by using a stage-geared automated gearbox with an automatic disk clutch, provided with a control system which coordinates the functioning of the service brake, the engine and the disk clutch of the automated gearbox.

Solutions configured according to these teachings of the invention prevent the vehicle from rolling in the wrong direction during a starting sequence, which reduces the loading in the clutch and moreover minimizes the risk of accidents.

The solution according to the invention also prevents the hill start system from being used as a parking brake. In the invention, only sensors located in the gearbox are used, for which reason no unnecessary cost is added to the selling price of the vehicle. The solution is moreover robust in relation to faults in component sensors as the necessary signals can in such a case be calculated in other ways. The solution functions in an intuitive way for the driver, which means that the driver is not surprised by the performance of the system with the result that a near-accident occurs.

SUMMARY OF THE INVENTION

An object of the invention is therefore to provide a method for facilitating hill-starting of a stationary motor vehicle in as simple and intuitive way as possible, and also a device for implementing the method of the invention.

The functioning of the invention is described in detail in the flow diagram in FIG. 3. In at least one embodiment, the method comprises (includes, but is not necessarily limited to) applying at least one braking device using a brake pedal. A control unit is used to estimate the traveling resistance of the vehicle, as well as determine a starting gear, a minimum engine torque and a minimum engine speed in order to overcome the estimated traveling resistance. The driver lets the brake pedal up completely and the control unit keeps the braking device applied so that the vehicle remains stationary.

The driver operates an accelerator pedal to a position at least corresponding to the minimum engine speed. A clutch device for the gearbox of the vehicle is activated by the control unit when the engine speed has reached the above-mentioned minimum engine speed. The control unit releases the braking device in parallel with the clutch device being coupled together so that the brake torque of the braking device decreases as a function of the increase in the engine torque transmitted by the clutch device.

In this connection, it is important that the braking device be fully released when the driving torque is sufficient to hold the vehicle stationary on the concerned uphill slope. The vehicle can then be started without rolling backward at the same time as the brakes are not kept applied for an unnecessarily long time.

"Traveling resistance" means primarily the force which has to be overcome by the engine torque transmitted by the clutch in order for the vehicle to start to roll forward. This depends mainly on the total weight of the vehicle and the gradient of the road. In this connection, it is also important that the control unit maintains the brake pressure only if there is a risk of the vehicle rolling in the wrong direction. If the traveling resistance indicates that the vehicle is standing on a flat road or on a downhill slope, the control unit does not maintain the brake pressure and start-up takes place in the usual way. The hill start function itself is therefore activated only if the vehicle is on an uphill slope. "Control unit" preferably means an electronic control unit that is used for controlling the transmission of the vehicle and which can (optionally, via other control units arranged in the vehicle) control functions such as the application of the service brakes.

The control unit preferably first determines a suitable starting gear and then a minimum engine torque and also a minimum engine speed in order to overcome the estimated traveling resistance. It is of course possible, however, to determine torque and speed first, and then a suitable starting gear. This can be done by calculating the torque for each gear and selecting the lowest gear that satisfies the minimum starting torque requirement.

One advantage of the above method is that the procedure makes it possible that the control unit does not have to apply the clutch, in spite of the brake pedal being let up and the accelerator pedal operated, if the accelerator pedal position and the engine speed are not sufficient to start the vehicle. Owing to the fact that the clutch is completely disengaged, the increase in engine speed and turbo pressure can take place more rapidly than if the clutch is partly coupled together. These advantages mean both increased starting rapidity and reduced clutch wear. The procedure is not possible without external application of the service brakes. Having the brakes applied by a mechanical or electronic arrangement which is not controlled directly by the driver is usually referred to as "external application".

According to an alternative embodiment of the invention, the control unit can, in the event of difficulties in estimating exactly the vehicle weight and the road gradient, adjust the time of full release of the braking device, for example in such a way that the release of the brakes is shifted forward in time in relation to the calculated balanced position so that the risk of rolling in the wrong direction is prioritized ahead of the risk of braking for too long.

According to another advantageous embodiment of the invention, the control unit can, in the event of difficulties in estimating exactly the vehicle weight and the road gradient, register the direction of rotation on one of the rotational speed sensors which register the speed of the vehicle. The information about the direction of rotation can be used in order to determine whether the external application of the service brakes is to be extended or shortened according to the following steps: (i) the hill start function has been activated as above and the control unit gradually releases the braking device in parallel with the clutch device gradually being engaged, (ii) if the vehicle rolls in the correct direction before the braking device is fully released, the control unit releases the braking device immediately, and (interconnection) if the vehicle rolls in the wrong direction before the braking device is fully released, the control unit extends or increases the external application in order to prevent movement of the vehicle in the wrong direction.

By means of the above steps, unnecessary application of the brakes during driving is avoided at the same time as is movement of the vehicle prevented in the wrong direction. This reduces clutch loading, brake loading and the distance the vehicle rolls in the wrong direction.

According to one advantageous embodiment, the method also comprises the following steps which apply if the driver does not operate the accelerator pedal sufficiently: (i) the hill start function has been activated as above, (ii) the driver lets up the brake pedal completely, (iii) the driver operates the accelerator pedal but not sufficiently to correspond to said minimum engine torque and minimum engine speed required in order to activate the clutch, (iv) the control unit maintains the brake pressure and the car remains stationary, and (v) the intuitive reaction of the driver is to apply more pressure to the accelerator pedal, the pedal finally reaching the position which corresponds to said minimum engine torque and minimum engine speed, the clutch then being activated, and it being possible for the vehicle to be set in motion according to the method above.

In another embodiment, the method also comprises the following steps in order to prevent the system being used as a parking brake: (i) the hill start function has been activated as above, (ii) the driver lets the brake pedal up completely, (iii) the driver does not operate the accelerator pedal, (iv) the control unit keeps the braking device applied with unchanged brake force for a predetermined time period, and (v) after this first time period, the control unit will release the braking device gradually over a second predetermined time period.

The above takes place automatically without intervention by the driver insofar as the latter does not interrupt the process by reapplying the braking device using the brake pedal.

According to another advantageous embodiment, the control unit limits the speed of the engine to a given speed which is a function of the accelerator pedal position when the driver has released the brake pedal and operates the accelerator pedal. This function allows the driver to hold the accelerator pedal fully depressed without the engine speed racing.

According to another embodiment, the control unit informs the driver that the hill start function is activated by means of, for example, a warning lamp in the instrumentation of the vehicle. The driver then knows that he has plenty of time to move the foot from the brake pedal to the accelerator pedal and that the control unit will regulate the brake pressure so that starting can take place without rolling backward irrespective of how rapidly the driver elects to operate the accelerator pedal. This takes place on condition that the driver operates the accelerator pedal within the abovementioned time period so that the function which prevents the system being used as a parking brake does not start to operate.

According to another alternative embodiment, the system described above can also be activated on a downhill slope in a case where the driver selects a reverse gear, or otherwise indicates to the control unit that a reverse gear is required in order to reverse up the hill. If the driver selects neutral gear, the function cannot be activated.

The device for implementing the method comprises a vehicle with at least one braking device and a brake pedal, an accelerator pedal and a control unit for controlling said braking device, engine speed and a clutch device for a gearbox. The braking device is arranged so as to be applied by the driver and, in the cases described above, to be released as a function of the increase in the transmitted, driving torque of the clutch or alternatively to be released if a given time period as mentioned above has passed since the driver let the brake pedal up fully without subsequently having operated the accelerator pedal. The brake can preferably be released proportionally to the transmitted torque of the clutch.

According to a preferred embodiment, the braking device consists of the service brake of the vehicle. In this text, the expression "service brake" means all the wheel brakes the driver operates while driving the vehicle. As it is to be possible for the brakes to be controlled by the control unit, the vehicle must be equipped with electronics for controlling at least the service brake. The control can take place using an existing electronically controlled brake system of pneumatic or hydraulic type, or with the aid of electrically operated brakes. In this context, the electronically controlled brake system consists of what is known as an EBS (Electronically controlled Brake System) which comprises a number of functions, for example ABS (anti-lock brakes), TCS (anti-spin control) and BCS (Braking Compatibility System). BCS takes in information from the wear warning system of the service brakes and on this basis regulates the brake pressure between front axle and rear axle. The BCS also includes a function which adapts the brake force between towing vehicle and towed vehicle so that each part of the vehicle combination brakes its own weight.

The vehicle is preferably provided with a number of different sensors, for example angle sensors for measuring the inclination of the vehicle relative to the horizontal plane and sensors for measuring the total weight of the vehicle. The latter sensors can consist of strain gauges, piezoelectric sensors which sense the vehicle weight directly, or pressure sensors which are positioned in proximity to the pneumatic suspension of the vehicle and emit signals that are proportional to the weight of the vehicle. According to the above method, the vehicle weight and the vehicle inclination determine the starting gear and the minimum engine torque and minimum engine speed required for starting.

The drive line of the vehicle can also be provided with torque sensors which measure torque that corresponds to the engine torque transmitted by the clutch device. The relationship between this measured driving torque and the abovementioned minimum engine torque determines the rate at which the brake torque from the braking devices is released by the control unit. The use of torque sensors makes the system insensitive to power drain in engine-driven units in the form of cooling fans, compressors and the like.

In order to increase robustness in the event of faults in these sensors, or in the absence of these sensors, the vehicle weight and the road gradient can also be estimated by measuring vehicle acceleration compared with fuel quantity injected into the engine or measured current driving torque in the torque sensor. Similarly, measured torque in the torque sensor can be replaced by a calculated torque which is based on engine torque and engine acceleration. In the case without torque sensors, these calculations may be sensitive to power drain in engine-driven units in the form of cooling fan, compressors and the like.

The gearbox preferably consists of a stage-geared automated gearbox provided with an automatic disk clutch. The disk clutch is arranged so as to be electronically controlled by the control unit, the vehicle therefore having no clutch pedal. The driver can choose between two settings for control of the gearbox. In an automatic position, the control unit handles both selection of gear and control of the engine in connection with shifting. In a manual position, the driver selects gear and time of shifting, if appropriate on the recommendation of the control unit, shifting and engine control themselves then being carried out by the control unit.

The gear selected by the control unit can be communicated to the driver via a display on the dashboard or in proximity to the gear selector.

The advantage of this type of automated gearbox compared with a conventional automatic gearbox constructed with planetary gear stages and with a hydrodynamic torque converter on the input side is on the one hand that, especially as far as use in heavy-duty vehicles is concerned, it is more simple and more robust and can be manufactured at a considerably lower cost than the conventional automatic gearbox. On the other hand, it's higher efficiency enables lower fuel consumption.

In this way, the high efficiency and durability of the stage-geared gearbox can be combined with the user-friendliness of the automatic gearbox, while at the same time providing a simple and safe hill start-up function. The invention results in reduced loading in the clutch, and moreover, the starting sequence is carried out in a shorter time. For example, a speed of roughly two kilometers per hour in the wrong direction doubles the clutch loading, compared with starting from stationary. Another advantage of the invention is that the application speed of the clutch can be reduced so that torque transients in the drive line are avoided as the vehicle is held stationary with the aid of the hill start function. The invention does not use predetermined fixed (engine torque) levels or predetermined times for releasing the service brake, but adapts to traveling resistance on the concerned hill and the fact that the time in order to achieve the abovementioned minimum driving torque varies on account of driver conduct, engine dynamics, turbo dynamics, and the losses in engine-driven units. The procedure is not possible without external application of the service brakes.

BRIEF DESCRIPTION OF THE DRAWINGS

The invention will be described in greater detail below with reference to illustrative embodiments shown in the accompanying drawings and in which.

DETAILED DESCRIPTION

Figure 1:
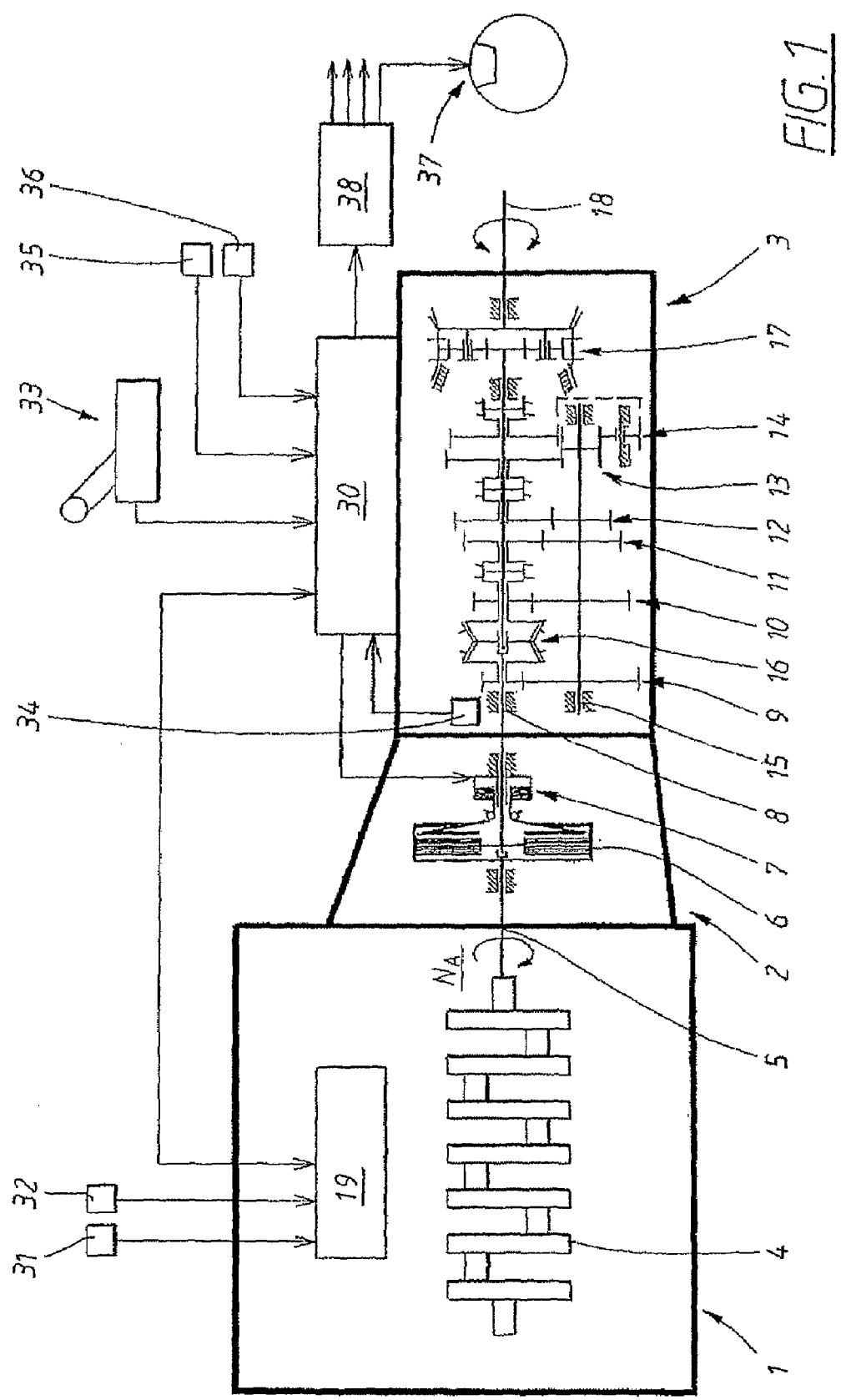
FIG. 1 shows a schematic diagram comprising a transmission and its control system configured according to one embodiment of the present invention.

FIG. 1 shows a schematic representation of the device according to an embodiment of the invention. The device comprises an engine 1, a clutch device 2 and a stage-geared automated gearbox 3. The engine exemplarily comprises a crankshaft 4 and an output shaft 5 provided with a flywheel (not shown in the figure) that is coupled to a single-plate dry disk clutch 6. The clutch is provided with a pneumatic piston/cylinder device 7, by means of which the clutch can be engaged and disengaged. The gearbox comprises an input shaft 8 which, via a number of gearwheel pairs 9, 10, 11, 12, 13, can drive an intermediate shaft 15. The gearwheel pairs 10, 11, 12, 13 represent four unsynchronized forward gears, and the gearwheel arrangement 14, 14', 14", with three gearwheels represents a reverse gear. In addition, the gearbox comprises a synchronized split gear 16 with a low gear stage LS and a high gear stage HS and also what is known as a range gear 17 for shifting between low range LR and high range HR. Such a gearbox and its operation are described in detail in Swedish Application SE 0101497-6. The output shaft 18 of the gearbox is connected to one or more driving wheel axles (not shown in FIG. 1).

When shifting of the unsynchronized gears in the basic gearbox takes place, the speed is synchronized by precision control of the rotational speed of the engine 1. The disk clutch 6 is therefore engaged so that the rotational speed of the main shaft 8 and the rotational speed of the intermediate shaft 15 are adapted to a newly selected ratio. The engine 1 is provided with an engine control unit 19 which regulates the engine speed depending on the fuel quantity injected and the engine brake.

When shifting of the synchronized gears takes place, that is to say the split gear 16 or the range gear 17, the speed adaptation is effected by means of synchronizing rings (not shown). The control unit 19 controls the fuel injection, that is to say the engine speed, depending on the accelerator pedal position, the control unit 30 controlling the air supply to the pneumatic piston/cylinder device 7 by means of which the disk clutch 6 is disengaged or engaged before and after engagement of a new gear selected is completed.

Figure 2:
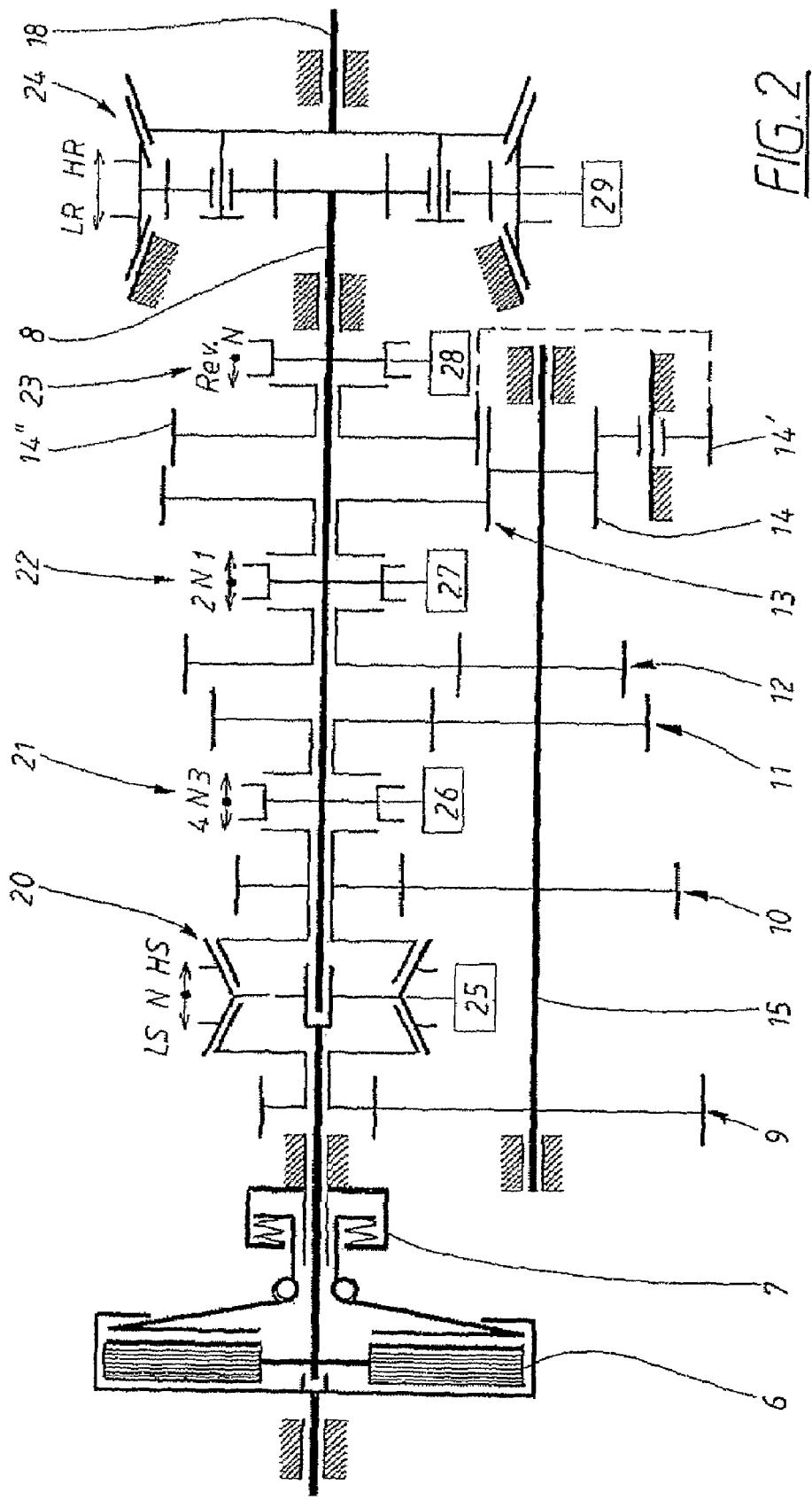
FIG. 2 shows a schematic representation of the gearbox of FIG. 1.

As can be seen from FIG. 2, a coupling sleeve 20, 21, 22, 23, 24 is positioned between each pair of gearwheels. The coupling sleeves 20, 21, 22, 23 24 are displaceable as shown by the arrows in FIG. 2, the gear stages shown in conjunction with the arrows being obtained. The coupling sleeves 20, 21, 22 for the split gear and gears 1–4 each have three positions, two gear positions LS, HS and a neutral position N (central position). The coupling sleeve 23 for the reverse gear has one gear position and a neutral position N. The coupling sleeve 24 for the range gear has two gear positions LR and HR. The displacement of the coupling sleeves is brought about by respective servo devices 25, 26, 27, 28, 29 indicated schematically in FIG. 2, which can be pneumatically operated piston/cylinder devices of the type used in a gearbox of the type described above which is marketed under the tradename I-SHIFT.

The servo devices 25, 26, 27, 28, 29 are controlled by an electronic control unit 30 (see FIG. 1) that comprising a microcomputer that depends on signals fed into the control unit representing various engine and vehicle data. The data, which comprises at least engine speed NA, vehicle speed, brake and accelerator pedal position 31, 32, and, where appropriate, engine brake on/off, is sent to the control unit 30 from the engine control unit 19. Further input signals are fed from an electronic gear selector 33 which is coupled to the control unit 30 and is adjustable between a manual shifting position and an automatic shifting position. When the selector is in the position for manual shifting, automated shifting takes place at the command of the driver via the gear selector 33. As can be seen from FIG. 1, the control unit 30 is also connected to a sensor 34 for measuring torque on the input shaft of the gearbox, a sensor 35 for sensing the total weight of the vehicle and a sensor 36 for sensing the inclination of the vehicle in the longitudinal direction. The control unit 30 is also arranged so as, under certain predetermined conditions, to control the service brake 37 of the vehicle via a control unit 38 for an anti-lock braking system. FIG. 1 shows only one of a number of braking devices included in the service brake.

In connection with a hill start on an uphill slope, the control unit 30 is arranged so as to control the fuel injection via the engine control unit 19, selection of gear via the servo devices 25, 26, 27, 28, 29, and the service brake 37 of the vehicle via the brake control unit 38 in a way which will be described in detail below.

The functioning of the device according to the invention when starting the vehicle from a stationary, parked position on an uphill slope is as follows: the driver holds the vehicle stationary by means of the service brake 37 of the vehicle while any parking brake is released. At the same time, the control unit 30 has made an estimate of the total weight of the vehicle and the gradient of the road (the traveling resistance) with the aid of signals from a number of weight-sensing and angle-sensing sensors 35, 36. At this stage the control unit 30 has estimated a suitable starting gear and a minimum required engine torque TE and a minimum required engine speed NE for the gearbox with regard to the estimated values for total weight and gradient. If the control unit 30 estimates there is a risk of the vehicle rolling in the wrong direction, the control unit 30 requests external application of the service brake 37. When the driver decides to take-off, he releases the brake pedal for the service brake 37 and steps on the accelerator pedal. When the driver releases the brake pedal, the control unit 30 continues sending a signal to the control unit 38 of the brakes with a request for continued application of the service brake 37.

The functioning is described primarily for starting the vehicle from a stationary, parked position, but it works in a corresponding way while underway in a case where the brakes have been applied externally when the vehicle has been stopped temporarily.

In the meantime, the driver has stepped on the accelerator pedal and the engine speed has started to increase. The control unit 30 limits the speed of the engine to a given speed which is a function of the accelerator pedal position. This function allows the driver to hold the accelerator pedal fully depressed without the engine speed racing. The accelerator pedal must then be held fully or partly depressed until the clutch is fully applied and the regulating procedure for hill-starting ceases. An approximate idling speed for heavy-duty trucks is roughly 600 rpm. If a certain combination of total weight and gradient requires a speed of 1000 rpm, the accelerator pedal must be held depressed in order to keep at least this value throughout the procedure until the clutch is fully applied and the vehicle rolls forward.

When the engine speed exceeds the minimum required engine speed, the clutch will be applied and a driving torque starts being transmitted to the driving wheels via the starting gear selected in the gearbox. The driving torque transmitted by the clutch 6 is determined by measurement by a torque sensor 34 on the input shaft of the gearbox, or is calculated as the engine torque minus the engine acceleration multiplied by the moment of inertia of the engine. The service brake 37 is released proportionally while the abovementioned transmitted driving torque increases. At the moment when the driving torque is sufficient to hold the vehicle stationary, the service brake is fully released and rolling backward is avoided. As the driver is at this time preferably holding the accelerator pedal depressed in a position corresponding to a higher engine torque than is required to hold the car stationary, the vehicle will start to roll in the selected direction.

Figure 3:
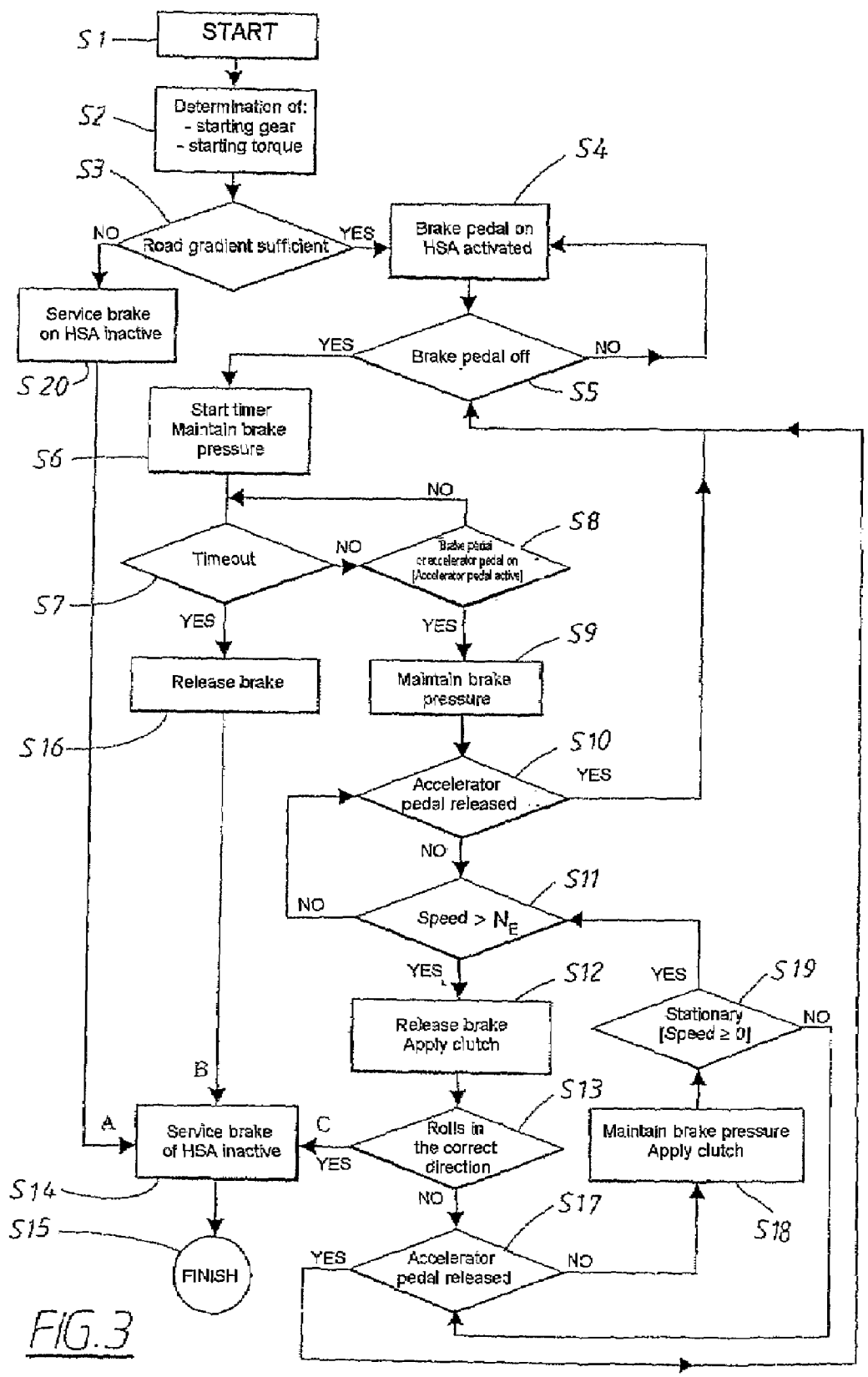
FIG. 3 shows a flow diagram to illustrate the control sequence.

FIG. 3 shows a diagram relating to an embodiment of the hill start function. The function is activated in connection with starting a stationary vehicle, for example when starting the vehicle from a stationary, parked position or while underway in the event of a temporary stop, on an uphill slope and proceeds according to the following description.

When the driver decides to start S1, the control unit makes an estimate of the traveling resistance of the vehicle. The traveling resistance is estimated by measuring the total weight of the vehicle and the gradient of the road with the aid of signals from a number of weight-sensing and angle-sensing sensors. It is also conceivable to take account of internal friction, for example with regard to the temperature of the engine and/or the gearbox. The control unit determines a minimum force required to overcome the estimated traveling resistance and on this basis selects a suitable starting gear for the gearbox, as well as a required starting torque from the engine S2. The criteria which determine the starting gear are starting rapidity, starting acceleration, clutch wear and the number of shifts required to achieve the desired speed. The control unit then determines a minimum starting torque $T_E$ and a minimum starting speed $N_E$ for the engine. By also taking account of starting rapidity and clutch loading, the device according to the invention can ensure that acceptably rapid starts can take place with minimum clutch loading. Depending on the gradient, starting speeds other than the idling speed of the engine can be selected.

A prerequisite for the function being activated is that the gradient of the hill exceeds a certain predetermined value S3. In this situation, the vehicle is held stationary with the aid of the service brake of the vehicle S4, while any parking brake is released. When the driver decides to drive off, he releases the brake pedal for the service brake S5 and steps on the accelerator pedal. When the driver releases the brake pedal, the control unit 30 continues sending a signal to the control unit 38 of the brakes with a request for continued application of the service brake S6. This external application of the service brake continues for a limited predetermined first time period of 1–5 seconds, and preferably roughly 1 second, and is monitored by a timer S7. When the time period has elapsed without the driver having depressed either the accelerator pedal or the brake pedal, the application of the service brake is gradually reduced irrespective of a continued request for external application S7 from the control unit.

When the timer S7 is started, whether the driver has stepped on the brake pedal or the accelerator pedal S8 is checked to confirm whether the engine speed has started to increase. The timer continues to count toward timeout as long as the accelerator pedal is not operated. When the accelerator pedal is operated, the control unit sends a signal to the brake system about maintaining the brake pressure S9. The driver must now depress the accelerator pedal to a position which is at least the same as, but preferably exceeds that required to maintain the minimum starting speed. In the meantime, the system checks that the accelerator pedal has not been let up S10.

According to this embodiment, the brake pressure will be maintained either until the driver releases the accelerator pedal or until the minimum starting speed is achieved. It is of course possible to introduce a time limit in this step as well.

When the actual engine speed reaches or exceeds the predetermined minimum starting speed S11, the control unit will control the speed of the engine toward a starting speed $N_{ST}$. The starting speed $N_{ST}$ is a function of accelerator pedal position and traveling resistance so that a higher starting speed is obtained for high traveling resistance and when the accelerator pedal is depressed relatively far. This function allows the driver to hold the accelerator pedal fully depressed without the engine speed racing. The accelerator pedal must then be held depressed to at least the abovementioned position until the clutch is fully applied and the regulating procedure for hill-starting ceases.

When the minimum starting speed $N_E$ has been obtained, the clutch will be applied S12 and a driving torque starts being transmitted to the driving wheels via the starting gear selected in the gearbox. The service brake is released proportionally to the increase in the driving torque. This procedure continues until the driving torque is sufficient to hold the vehicle stationary and it is detected that the vehicle is rolling in the selected direction S13. Information about the direction of movement of the vehicle is obtained from a sensor which emits a positive or negative rotational speed signal proportional to the speed of the vehicle. At the moment when the vehicle starts to roll, the service brake is fully released and the hill start function can be deactivated S14. As the driver is at this time preferably holding the accelerator pedal depressed in a position corresponding to a higher torque than the minimum starting torque, the speed of the engine will increase when the hill start regulating procedure of the control unit ceases. The ordinary control program of the control unit thus takes over S15.

The system also handles deviations from the normal functioning described above. If the system detects that the accelerator pedal has been let up S10 after a first signal about it having been activated S8, or while the system is waiting for the speed of the engine to achieve the minimum starting torque S11, it is checked whether the driver has activated the brake pedal again S5. If the brake pedal has not been activated, the timer will be started again S6. The driver can thus restart the function by activating the accelerator pedal again S8 or alternatively allow the timer to go to timeout S7 and allow the service brake to be released gradually S16 in order to interrupt the function S14.

The application of the service brake is reduced gradually S16 irrespective of a continued request for external application. The reduction of the external application of the service brake continues for a limited predetermined second time period of 1–5 seconds, preferably roughly 1 second, after which the service brake is not applied at all. This is a safety function which is intended, inter alia to prevent the function being used as a parking brake. If the driver has not reacted by reapplying the brake pedal when the external application ceases, an additional safety function may be the actuation of the parking brake when it is detected that there is a risk of the vehicle starting to roll in the wrong direction.

If the system detects that the vehicle is rolling in the wrong direction, S13, that is to say that the speed v>0 opposite to the selected direction, in connection with the clutch being applied S12, it is checked whether the accelerator pedal has been let up S17. If so, it is checked whether the driver has activated the brake pedal again S16. The regulating procedure then continues in the same way as for the case described in connection with the speed check S11 above. If it is detected that the driver has not released the accelerator pedal S17, the system will maintain the brake pressure while the clutch continues to be applied S18. A check is then carried out as to whether the vehicle is either stationary or rolling in the correct direction S19, that is to say that the speed v>0 in the selected direction. If the vehicle is still rolling in the wrong direction, steps S17, S18 and S19 are repeated. This can occur if the original calculation of estimated torque and optimum speed produced values which were too low. When the vehicle is at least stationary S19, the simultaneous release of the service brake and application of the clutch S12 is resumed. When the clutch is fully or virtually fully applied, the vehicle will roll in the correct direction S13. If the service brake is not fully released in this situation, the brake pressure is released S14 and the function is interrupted. The information about the movement direction of the vehicle can therefore be used in order to release the service brake early, that is to say before the clutch is fully applied and on condition that the vehicle has started rolling in the correct direction.

If the control unit detects in the initial stage that the gradient of the road is not sufficient S3 for activating the hill start function, activation of the brake pedal S20 will result only in the function remaining inactive. In this case, the regulating procedure goes directly to the last step S14, after which the ordinary control program of the control unit takes over S15.

According to another alternative embodiment, the electronic brake control EBS is provided with anti-spin control TCS for the brakes in addition to the anti-lock system ABS. Should the control unit 35 of the brakes detect that the driving wheels are spinning in connection with a hill start, the anti-spin control of the brakes will take over control of the brake pressure. This can occur as the spinning wheel or wheels rotate(s) in the correct direction, which means that the hill start function is disconnected.

According to another alternative embodiment of the invention, it is possible, in the event of difficulties in estimating exactly the starting torque and minimum starting speed NE mentioned above, to select the time for release of the service brakes in such a way that the probability of rolling in the wrong direction compared with braking for too long has a desired distribution.

According to another alternative embodiment, the transmission control system informs the driver of the vehicle about when the function according to the invention is activated by means of a warning lamp or display arranged in the vehicle. According to another alternative embodiment, the system described above can also be activated on a downhill slope in a case where the driver engages a reverse gear, or otherwise indicates to the control unit that a reverse gear is required, in order to reverse up the hill.

The invention is not to be regarded as being limited to the illustrative embodiments described above, but a number of further variants and modifications are conceivable while still within the scope of the patent claims.

What is claimed is:

1. A device for facilitating hill—starting of a stationary motor vehicle, said device comprising:
    at least one braking device and a brake pedal, an accelerator pedal, a control unit (30) for controlling said braking device, engine speed and a clutch device (2) for a gearbox (3);
    at least one sensor for measuring the state of at least one of the devices indicated above; and
    said braking device being configured to be applied by the driver and to be released proportionally to the increase in the transmitted, driving torque of the clutch when the speed of the engine reaches a minimum speed (NE) which is estimated by the control unit (30) and is a function of the total weight of the vehicle and the gradient of the hill.

2. The device as recited in claim 1, wherein the braking device is arranged so as to be fully released when the driving torque is sufficient to hold the vehicle stationary.

3. The device as recited in claim 1, wherein the braking device is arranged so as to be applied by the control unit for a predetermined time period after the driver releases the brake pedal.

4. The device as recited in claim 3, wherein the braking device is arranged so as to be released gradually during a second predetermined time period if the accelerator pedal has not been operated.

5. The device as recited in claim 3, wherein the time period is 1–5 seconds.

6. The device as recited in claim 1, wherein the braking device consists of the service brake (37) of the vehicle.

7. The device as recited in claim 1, wherein the control unit is arranged so as to estimate a required starting torque with regard to the total weight of the vehicle and the gradient of the hill.

8. The device as recited in claim 7, wherein the control unit is arranged so as to estimate a required starting gear for the gearbox.

9. The device as recited in claim 8, wherein the control unit is arranged so as to control the speed of the engine toward a starting speed (NST) when the speed requested by the driver exceeds said minimum speed (NE).

10. The device as recited in claim 9, wherein the clutch is arranged so as to be activated when the speed of the engine is approximately equal to said minimum speed.

11. The device as recited in claim 1, wherein the gearbox is provided with an automatic disk clutch.

12. The device as recited in claim 11, wherein the disk clutch is arranged so as to be controlled by the control unit.

13. The device as recited in claim 7, wherein a sensor connected to the control unit is an inclination sensor.

14. The device as recited in claim 7, further comprising a sensor connected to the control unit and configured as a torque sensor.

15. The device as recited in claim 7, further comprising a sensor connected to the control unit and configured as a weight sensor.

16. The device as recited in claim 7, further comprising a sensor connected to the control unit and configured as a direction sensor for determining the direction of movement of the vehicle.

* * * * *